Nov. 9, 1937.　　　　H. A. BURGESS　　　2,098,613
AUTOMATIC PARACHUTE
Filed Feb. 1, 1937　　　2 Sheets-Sheet 1

INVENTOR.
Henry A. Burgess
BY
Lyon & Lyon
ATTORNEYS

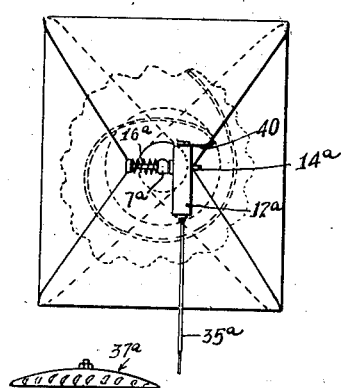

Patented Nov. 9, 1937

2,098,613

UNITED STATES PATENT OFFICE 2,098,613

AUTOMATIC PARACHUTE

Henry A. Burgess, Los Angeles, Calif., assignor of one-half to Silas A. Morehouse Application February 1, 1937, Serial No. 123,417

9 Claims. (Cl. 244—150)

This invention relates to parachutes and particularly to parachutes for use as safety devices by passengers of airplanes, although it also has other fields of usefulness.

A broad object of the invention is to provide completely automatic release of a pack parachute after the wearer thereof has jumped, and reduce the possibility of premature accidental release of the parachute.

Another object is to utilize the relative motion between a freely falling parachute pack and the surrounding air to release the pack and thereby reduce the possibility of either premature or unduly delayed release.

Another object is to provide practicable apparatus that is simple and relatively foolproof for automatically opening a pack parachute.

Parachutes of the type used by airplane pilots and passengers are pretty well standardized today. To the best of my knowledge, all such devices in commercial use comprise a pack containing the parachute, which pack is attached by a suitable harness to the body of the user. In operation, the user jumps or drops from the airplane, waits until he falls clear of the airplane and then pulls a handle which opens the pack and ejects the parachute so that it is caught by the air and opened. An inherent defect of these parachutes is that they require the user to perform an operation after he has jumped and preferably within a definite interval of time after he has jumped. If the user should faint or become confused he might fail to open his chute at all or open it too soon or too late for proper results.

I am aware that attempts have been made to solve the problem presented by the use of automatic timing devices to be manually released just prior to the jump and functioning to eject the parachute a predetermined time after the manual release of the timing device. Such devices are open to the criticism that in the confusion usually prevailing when a jump becomes necessary they may be prematurely actuated a substantial interval of time before the jump, thereby causing the parachute to open too soon or the wearer may fail to actuate the release at all.

In accordance with the present invention, I provide for automatic opening of the parachute after the wearer has jumped by employing a release mechanism actuated solely in response to free movement of the wearer and pack through the open air so that it cannot be prematurely tripped. In one embodiment of the invention I employ a wind wheel or propeller connected to the pack, which wheel is rotated by the air stream created past the pack while the wearer is falling and releases the parachute after making a predetermined number of revolutions.

In another embodiment I utilize air pressures created by the falling motion of the pack to release the parachute.

However, in both embodiments the design is such that the parachute cannot be released by physical forces other than those resulting in response to rapid motion of the pack with respect to the surrounding air, thereby making accidental premature release of the parachute practically impossible.

Several embodiments of the invention will now be described in detail with reference to the drawings, in which Fig. 1 is a general view showing a man wearing a parachute pack in accordance with the invention;

Fig. 7 is a rear view of a parachute pack involving features slightly different from the construction shown in Figs. 2, 4, 5 and 6;

Fig. 8 is a view illustrating the operation of the modification of the pack shown in Fig. 7;

Fig. 9 is a sectional view through a further modification of the invention, employing a device responsive to varying air pressures for releasing the parachute; and Fig. 10 is a schematic diaphragm illustrating a modification of the structure shown in Fig. 9.

Referring to Figs. 1 to 6, there is depicted a parachute pack 1 adapted to be secured to the body of a wearer by a harness 2. The pack proper and harness may be constructed in accordance with standard practice and do not constitute a part of the present invention. Suffice it to say that the pack consists of a fabric case dimensioned to receive a folded parachute and having four flaps 3, 4, 5 and 6, respectively, which fold in from the edges in overlapping relation and constitute the rear wall of the pack. The flaps are normally maintained in closed position by a mechanism to be described, but when released they fly open, permitting the parachute within to escape and be opened by the rush of air. It is usual practice to include within the pack, in addition to the main parachute, a small pilot parachute which is attached to the tip of the main parachute and functions to draw out the main parachute in such a way as to prevent fouling of the lines and to insure prompt opening of the main parachute. The pack shown in Figs. 1 to 6 is intended to be employed with a standard parachute equipped with a pilot parachute as described.

Figure 5:
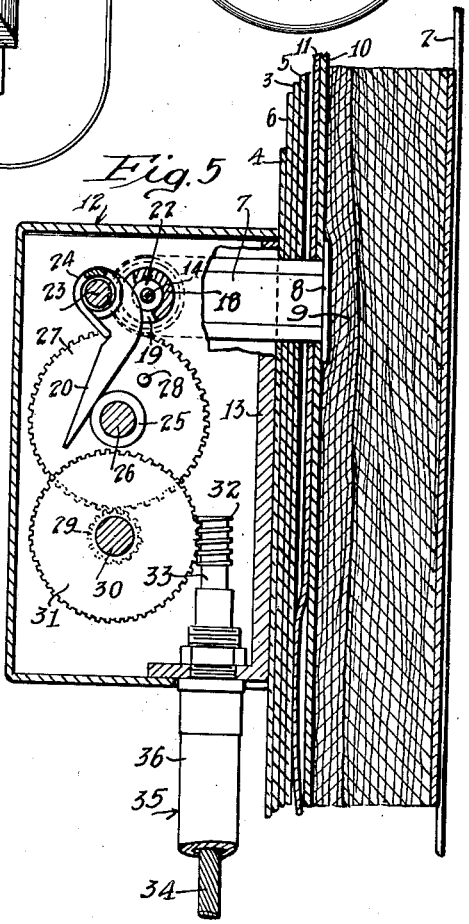
Fig. 5 is a sectional view through the case shown in Fig. 4 and through a portion of the parachute pack adjoining it, the view being taken at right angles to the view of Fig. 4 in the plane V—V of Fig. 2.

Referring now to Fig. 5, it will be observed that the flaps 3, 4, 5 and 6 overlap at the center and are provided with apertures which register with each other and slip over a pin 7 which projects outwardly therethrough. The inner end of the pin is provided with a flat head or base 8 which rests against the folded parachute 9 within the pack.

There is provided between the head 8 of the pin 7 and the innermost flap of the pack a resilient member consisting of a pair of plates 10 and 11 of spring material such as thin steel, which are normally concave, the outer plate 11 being concave outwardly and the inner plate 10 being concave inwardly, but which are deformed into substantially flat position in the pack. These spring plates 10 and 11 function to positively force the flaps off the pin 7 when the flaps are released.

To retain the flaps 3, 4, 5 and 6 on the pin 7, the locking mechanism is provided consisting of a case 12, one wall 13 of which is adapted to lie flat against the outermost flap on the pack and from which projects a lock bolt 14 which extends through an eye 15 in the outer end of the pin 7. A coil compression spring 16 surrounds the bolt 14 beyond the pin 7, being compressed between pin 7 and a head 17 on the outer end of bolt 15. The spring 16 is very highly compressed so that it can expand sufficiently to eject the bolt 14 completely from the eye 15, when permitted to do so. However, the bolt 14 is normally retained in the position shown in Figs. 4 and 6, in which the spring 16 is compressed, by a lock mechanism within the case 12.

Figure 6:
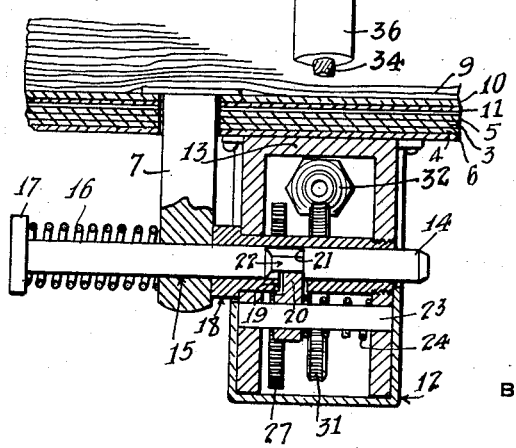
Fig. 6 is a detailed cross sectional view through the gear case and a portion of the parachute pack, the view being taken in the plane VI—VI of Fig. 2.

Referring to Figs. 5 and 6, it will be observed that the bolt 14 is received by and extends through a sleeve 18 extending completely through the case 12 from one side to the other and that this sleeve 18 has a window 19 in one side thereof through which projects a portion of a cam arm 20. This lever 20 normally engages against a shoulder 21 constituting one end face of a recess 22 in the bolt 14, thereby preventing ejection of the bolt 14 by the spring 16. The cam arm 20 is supported on a shaft 23 extending parallel to the sleeve 18 and journaled in the opposite walls of the case 12. A helical spring 24 surrounding the shaft 23 and having its opposite ends anchored respectively to the case 12 and the cam arm 20 applies a constant torque to the cam arm 20, tending to hold it in the recess 22 in bolt 14, i. e., in such position as to lock the bolt in place. The outer end of the cam arm 20 normally rests against a sleeve 25 on a shaft 26 which is journaled in opposite side walls of the case 12 and carries a gear wheel 27 having a pin 28 projecting therefrom in such position as to intercept the arm 20 when gear 27 rotates. Therefore, in response to rotation of gear 27, the pin 28 will intercept the cam arm 20 and rotate it in such direction as to disengage it from the bolt 14, permitting ejection of the bolt by the spring 16. Gear 27 meshes with pinion 29 keyed on a shaft 30, journaled in the side walls of the case 12. The shaft 30 also has keyed thereto a worm wheel 31 meshing with a worm 32 on a shaft 33 which is connected to the inner rotatable member 34 of a flexible cable 35. The outer stationary member 36 of cable 35 is anchored to the wall of casing 12.

Cable 35 is preferably several feet in length and carries on its outer end a wind wheel 37 which is secured to the rotatable cable shaft 34 for rotation therewith. The wind wheel 37 may be of substantially disc shape slightly cupped on the side to which the cable 35 is connected and provided with inclined vanes 38 which tend to produce rotation of the wheel 37 in response to rush of air therepast. The wind wheel 37 is preferably constructed of soft rubber or some other yieldable material so that it cannot be readily broken or damaged and cannot readily damage anything else that it might strike.

The case 12 may have no other attachment to the pack aside from that afforded by the pin 7. However, to prevent loss of the assembly in use, it may be desirable in some instances to attach the case 12 to the outermost flap of the pack as by sewing or riveting.

Figure 1:
Figure 2:
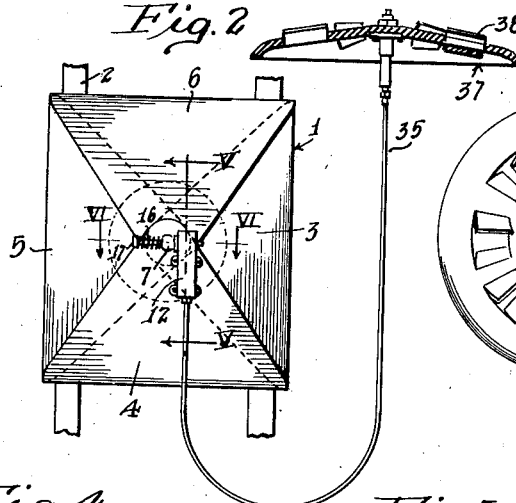
Fig. 2 is a rear elevation view of a pack equipped with an air wheel in accordance with the invention, the air wheel being shown in cross section.
Figure 3:
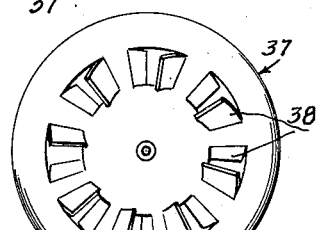
Fig. 3 is a top view of the air wheel disclosed in Fig. 2.
Figure 4:
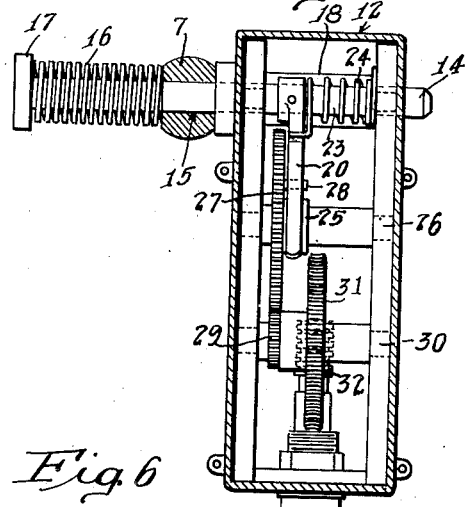
Fig. 4 is a detailed vertical section through a gear case employed on the pack shown in Fig. 2.

The mechanism described functions as follows:—Assume that all of the elements of the mechanism are in the position shown in Figs. 1 to 6 and that the wearer of the pack is ready to make a jump. He may hold the wind wheel 37 in his hand as illustrated in Fig. 1 while he goes overboard or the wheel may merely be permitted to dangle on the end of the cable 35.

If the plane is traveling at a high rate of speed at the time the jumper goes overboard he will have a high initial velocity in the direction of the travel of the plane, with respect to the surrounding air. In any event, he will start to fall rapidly after jumping so that either immediately upon leaving the airplane or very shortly thereafter the jumper will be traveling at relatively high velocity through the air. Since the ratio of the weight of the wind wheel 37 to the area it exposes is relatively small compared to the ratio of the weight of the jumper and the parachute pack to the area they expose, the wheel 37 will act as a wind anchor and will trail leeward of the parachute pack, on the end of the cable 35. This is desirable because it insures that regardless of the fact that the jumper may be turning over and over in the air and assuming various positions, the wind wheel 37 will be always in the same relative position with respect to the air stream so that the latter will rotate the wheel. This rotation of the wheel is transmitted through the cable 34 to the worm 32, thereby slowly rotating the shaft 30 and the gear wheel 29 which in turn rotates the gear wheel 27 even more slowly. After the wind wheel 37 has rotated through a predetermined number of revolutions, the pin 28 on the gear 27 comes in contact with the cam arm 20 and forces the latter out of the recess 22 in the bolt 14, whereupon the spring 16 immediately ejects the bolt out of the eye 15 in pin 7, permitting the flaps 3, 4, 5 and 6 on the pack to escape from the pin 7. Escape of the flaps from the pin 7 is positively insured by the spring plates 10 and 11. The opening of the flaps of the parachute permits the escape and opening of the parachute therewithin in the usual manner.

The structure described is practically foolproof for the reason that the only way in which the bolt 14 can be ejected from the pin 7 is by the rotation of the wind wheel 37 through a relatively large number of revolutions. Hence any accidental turning of the wind wheel by contact with other objects would be insufficient to release the pack. On the other hand, because of the gear reduction between the worm wheel and the shaft 25, a relatively slight torque applied to the wind wheel 37 will suffice to rotate it at high speed, thereby insuring release of the bolt 14 in response to free fall of the pack and its wearer through the air. The delay between the time when the jumper goes overboard and the parachute opens may be controlled by varying the speed reduction between the shaft 33 and the shaft 26 or it may be varied by presetting the device with the pin 28 a desired distance from the cam arm 20. The jumper if he so desires may also manually delay the opening of the parachute by holding the wind wheel 37 in his hand after he has jumped in such a way as to restrain it from rotation.

In the structure described it may be assumed that the pack will contain a standard parachute assembly including, in addition to the main parachute, a small pilot parachute for drawing out the main parachute. However, it is possible with the construction described to dispense with a separate pilot parachute and utilize the wind anchor effect of the wheel 37 to withdraw the parachute from the pack after the pack has been opened. The only change necessary to effect this operation is to leave the case 12 free with respect to the outer flap of the parachute pack so that it can carry clear of the pack after release of the bolt 14, and the connection of the case 12 by means of a flexible cable to the tip of the parachute within the pack. Thus referring to Fig. 7, the case 12a may be connected to one end of a flexible cable 40 which extends in between the edges of the flaps 3, 4, 5 and 6 to the interior of the pack and may be attached at its inner end to the tip of the main parachute in exactly the same fashion as a pilot parachute would be attached thereto. Aside from the differences mentioned, the construction shown in Fig. 7 may correspond exactly with those shown in Figs. 1 to 6. After the jumper wearing the parachute construction shown in Fig. 7 has gone overboard, the wind wheel (not shown in Fig. 7) attached to the cable 35a will rotate to release the bolt 14a exactly as previously described. Release of the bolt 14a permits release of both the case 12a and all of the flaps of the pack from the pin 7a, whereupon the drag of the air wheel on the cable 35a immediately pulls the case 12a away from the pack, straightening out the flexible cable 40 and eventually withdrawing the tip of the parachute from the pack as shown schematically in Fig. 8.

The embodiments of the invention so far described rely for their operation upon the use of an air wheel or propeller which rotates in response to motion through the air to rotate a timing shaft and, after a predetermined number of revolutions, release the parachute. I will now describe with reference to Fig. 9 a modified form of the invention in which pressures are created in response to falling movement of the pack through the air, which pressure is utilized to release a rotating mechanism which in turn opens the pack to release the parachute. This embodiment comprises a parachute which may be identical with that shown in Fig. 5, together with a pin 7b, spring plates 10b and 11b corresponding to pin 7 and plates 10 and 11 in Fig. 5. The pin 7b is also provided with an eye 15b adjacent its outer end which received a bolt 14b extending through and supported in a case 12b in substantially the same manner as shown in Fig. 6. The bolt 14b is likewise normally locked against withdrawal by cam arm 20b adapted to be released by a pin 28b on a gear wheel 27b.

The gear wheel 27b, however, meshes with a gear 45 on a shaft 46 to which torque is applied by a clock spring 47. Gear 45 also meshes with a pinion 48 on a shaft 49 to which is keyed a detent wheel 50 which is normally held against rotation by a detent 51 on one end of a lever 52 which is fulcrumed at the center on a stationary pivot member 53 and is connected at its opposite end by a link 54 to the center of a diaphragm 55 constituting one side wall of an air-tight chamber 56, the remaining walls of which are preferably relatively rigid. The chamber 56 is connected through a hollow tube 57 to the atmosphere through apertures 58 positioned on the outer end of the tube 57 and immediately adjacent a cup-shaped air anchor member 59. The member 59 may, like the air wheel 37 of Fig. 3, be constructed of soft rubber or other resilient material so that it cannot be readily injured and cannot readily injure other objects it might strike. The tube 57 is also so constructed and reinforced as to have substantially tensile strength in addition to serving as an air-tight tube.

In normal condition of the apparatus the diaphragm 55 is flat as shown in Fig. 9 and is exposed to equal pressures on both sides, the interior of the chamber 56 being connected to the exterior through the tube 57 and the aperture 58 and the outside being connected to the atmosphere through the case 12b which is not airtight. With the diaphragm 55 in normal position the detent 51 engages the wheel 50 and prevents rotation of the gear train so that the lock bolt 14b remains locked in position by the cam arm 20b. However, when the user of the parachute goes overboard and is exposed to the high velocity air stream resulting either from his initial velocity resulting from the movement of the plane or from velocity acquired by gravity, the air anchor 59 is caught in the air stream and caused to trail behind the pack. In trailing position the cup-shaped member 59 acts as an air scoop so that the pressure adjacent the apertures 58 is increased substantially above normal atmospheric pressure, causing air to flow in through the apertures 58 and through the tube 57 into the chamber 56 until the pressure therein equals the pressure adjacent the apertures 58. Since the force exerted on the diaphragm 55 is a function both of the differential pressure existing on the opposite sides of the diaphragm and the area of the diaphragm, sufficient force can easily be generated to force the diaphragm downwardly, thereby rotating the lever 52 and disengaging the detent 51 from the wheel 50, whereupon the lock spring 47 rotates the gear 27b to carry the pin 28b past the cam arm 20b, forcing the latter out of engagement with the bolt 14b and permitting the release of the latter. Of course, the release of the bolt 14b permits the parachute to open as has been previously described with reference to Figs. 1 to 6.

Since pressures sufficient to release the detent 51 may be generated immediately after the jumper leaves a rapidly moving airplane, the clock mechanism is desirable to introduce a time delay. By initially setting the clock mechanism in such position that the gear wheel 27b has to rotate through a substantial part of the revolution before the pin 28b contacts the cam arm 20b, a considerable time lag may be introduced between the actuation of the detent 51 and the release of the bolt 14b. If desired, this time lag may be further increased by providing an escapement or a vane to reduce the speed of rotation of the elements after the detent has been disengaged.

The arrangement shown in Fig. 9 depends for its operation on the fact that the air pressure on the forward side of the body moving rapidly through the air will be built up to a value above atmospheric pressure. It is also well known that the air pressure on the rear side of a body moving through the air is often reduced to a value below atmospheric and a considerable reduction of the pressure on the rear side of the body, due to the motion of the body, can be effected by proper design of the body. It is to be understood that the present invention may be practiced using such sub-normal pressures instead or in addition to relying upon pressures above normal.

A modified structure in which both pressures above normal and pressures below normal are utilized is illustrated schematically in Fig. 10, in which elements corresponding to the elements in Fig. 9 bear the same reference numerals with the suffix "c". It will be observed that case 12c in Fig. 10 is provided with an additional wall 62 positioned below the diaphragm 55c and provides an extra air-tight compartment 63 below the diaphragm. The pin 54c passes through a bushing 64 in the wall 62, the bushing being closely fitted to the pin so that the connection is substantially air-tight. The wind anchor 59c may be of substantially the same shape as the member 59 in Fig. 9 but the connecting member between the case 12c and the member 59c defines two passages 65 and 66, respectively, which communicate with the chamber 56c and the chamber 63, respectively. At their outer ends the passages 65 communicate with the interior and the exterior, respectively, of the member 59c.

The arrangement shown in Fig. 10 functions exactly the same as that shown in Fig. 9 except that the action is made more positive by virtue of the fact that the sub-atmospheric pressure created on the rear side of the member 59c when it is moving rapidly through the air is applied through the chamber 63 and becomes effective on the lower side of the diaphragm 55c, thereby helping to move the diaphragm downwardly to release the detent 51c.

Obviously under some conditions the sub-atmospheric pressure applied to the under side of the diaphragm 55c might be sufficient alone to actuate the device, under which conditions the chamber 56c could be open to the atmosphere and the passage 65 eliminated.

Although the invention has been explained by describing a number of specific embodiments thereof, it is to be understood that other variations may occur to those skilled in the art and the invention is to be limited only as set forth in the appended claims.

I claim:

1. In combination with a parachute pack having a release mechanism for releasing the parachute in response to actuation of said release mechanism, flexible cable means extending from said pack and air anchor means on the outer end of said cable offering substantial resistance to an air stream whereby said air anchor means trails leeward of the pack in an air stream regardless of the position of the pack in the air stream, and means independent of tension exerted on said cable means for actuating said release mechanism in response to creation of an air stream past said anchor means.

2. In combination with a parachute pack having a release mechanism for releasing the parachute when the release mechanism is actuated, a member releasably attached to the pack and permanently attached to the parachute within the pack, said member having flexible cable means attached thereto and extending therefrom, air anchor means on the outer end of said cable and offering substantial resistance to an air stream whereby said air anchor means trails to leeward of the pack in an air stream regardless of the position of the pack, and means independent of tension on said cable for actuating said pack release mechanism and releasing said member from the pack in response to creation of an air stream past said air anchor means whereby said parachute is released from the pack and pulled out of the pack by said air anchor means in response to and only in response to creation of an air stream past said pack.

3. In combination with a parachute pack having a release mechanism for releasing the parachute in response to actuation of the release mechanism, a wind wheel rotatable in response to an air stream therepast, means for actuating said release mechanism in response to predetermined rotation of said wind wheel, and flexible cable means connecting said wind wheel to said pack whereby the wind wheel trails to leeward of the pack in proper position to be rotated by an air stream past the pack regardless of the position of the pack with respect to the air stream.

4. Apparatus as specified in claim 3, in which the means for actuating the release mechanism is mounted on said pack and connected to said wind wheel for rotation thereby through said flexible cable whereby the cable functions both to attach the wind wheel to the pack and rotatably couple the wheel to said actuating means.

5. Apparatus as described in claim 1, in which said air anchor means is of soft resilient material maintaining its normal operative shape by virtue of its own resilience independent of an air stream therepast.

6. Apparatus as described in claim 3, in which the means for actuating said release mechanism comprises a shaft rotatable through less than one revolution from non-actuating to actuating position, and speed reducing means coupling said wind wheel to said shaft.

7. Apparatus as described in claim 1, in which said air anchor means includes means for developing a pressure different from atmospheric pressure in response to an air stream therepast, means for actuating said release mechanism comprising a device responsive to pressure different from atmospheric, and means for applying pressure developed by said air anchor means to said pressure responsive device.

8. Apparatus as described in claim 1, in which said air anchor means includes means for developing a pressure different from atmospheric pressure in response to an air stream therepast, said means for actuating said release mechanism comprising a device responsive to pressures different from atmospheric with time delay means interconnecting said pressure responsive device to said release mechanism, and means for applying pressure developed by said air anchor means to said pressure responsive device whereby the parachute is released a predetermined interval following inception of said rapid motion of said pack through the air.

9. In combination with a parachute pack having a release mechanism for releasing the parachute when the release mechanism is actuated, means for actuating said release mechanism in response to fluid pressure different from atmospheric, and means for developing and applying to said pressure responsive means a fluid pressure different from atmospheric in response to rapid motion of said pack through the air.

HENRY A. BURGESS.